United States Patent
Barber

(10) Patent No.: US 11,636,538 B1
(45) Date of Patent: Apr. 25, 2023

(54) SYSTEM AND METHOD FOR ESTABLISHING AND MANAGING RESERVE ACCOUNTS ASSOCIATED WITH AUTOMOTIVE LOAN APPROVAL

(71) Applicant: David Barber, Lakeland, TN (US)

(72) Inventor: David Barber, Lakeland, TN (US)

(*) Notice: Subject to any disclaimer, the term of this patent is extended or adjusted under 35 U.S.C. 154(b) by 0 days.

(21) Appl. No.: 16/988,771

(22) Filed: Aug. 10, 2020

Related U.S. Application Data

(60) Provisional application No. 62/884,323, filed on Aug. 8, 2019.

(51) Int. Cl.
*G06Q 40/00* (2012.01)
*G06Q 40/02* (2023.01)

(52) U.S. Cl.
CPC .................. *G06Q 40/025* (2013.01)

(58) Field of Classification Search
CPC ....... G06Q 40/00; G06Q 40/02; G06Q 40/025
USPC .......................................................... 705/38
See application file for complete search history.

(56) References Cited

U.S. PATENT DOCUMENTS

| | | | | |
|---|---|---|---|---|
| 8,626,645 B1* | 1/2014 | Lazerson | ............... | G06Q 40/02 705/38 |
| 2002/0194120 A1* | 12/2002 | Russell | ................ | G06Q 40/025 705/38 |
| 2006/0074794 A1* | 4/2006 | Nespola, Jr. | ......... | G06Q 40/025 705/38 |
| 2007/0288357 A1* | 12/2007 | Holman | ................. | G06Q 40/02 705/38 |
| 2008/0015954 A1* | 1/2008 | Huber | .................... | G06Q 40/02 705/28 |
| 2008/0040259 A1* | 2/2008 | Snow | .................... | G06Q 40/02 705/38 |
| 2018/0204261 A1* | 7/2018 | Garcia, III | .............. | G06T 11/60 |

OTHER PUBLICATIONS

Credits and debits on the Internet IEEE 1997 (Year: 1997).*
Rural Microfinance Service Delivery: Gaps, Inefficiencies and Emerging Solutions IEEE 2007 (Year: 2007).*

* cited by examiner

*Primary Examiner* — Bruce I Ebersman
(74) *Attorney, Agent, or Firm* — Wayne Edward Ramage; Baker Donelson

(57) ABSTRACT

A system and method for providing a corporate "co-signor" for potential purchasers of an automobile who do not meet captive lender or standard bank approval guidelines. The corporate co-signor does not sign or execute loan documents alongside the purchaser in a manner similar to co-signors in the prior art, but instead guarantees the loans that are underwritten using a "cosignloan" product implemented in agreement with a captive lender. The loan is based on a payment-to-income (PTI) basis, supported by the security provided by the corporate co-signor. The dealer will then be able to use the "cosignloan" product parameters to provide appropriate new, used, or certified pre-owned vehicles to the customer/purchaser. The corporate co-signor receives an administration fee for each loan. The administration fee, in one embodiment, is sent to a reserve account by the captive lender from the dealer booking proceeds. The reserve account is controlled by the corporate co-signor and the captive lender, and has specific debit and credit guidelines to ensure that sufficient funds are available to pay defaulted loans for a particular year until all loans booked in that year are satisfied.

7 Claims, 2 Drawing Sheets

SYSTEM AND METHOD FOR ESTABLISHING AND MANAGING RESERVE ACCOUNTS ASSOCIATED WITH AUTOMOTIVE LOAN APPROVAL

This application claims benefit of and priority to U.S. Provisional Application No. 62/884,323, filed Aug. 8, 2019, which is incorporated herein in its entirety for all purposes by specific reference.

FIELD OF INVENTION

This invention relates to a system and methods to provide a low-risk or no-risk alternative to traditional co-signor financing methods.

SUMMARY OF INVENTION

In various exemplary embodiments, the present invention comprises a system and method for providing a corporate "co-signor" for purchasers of an automobile who do not meet captive lender or standard bank approval guidelines and are in need of a co-signor. The corporate co-signor does not sign or execute loan documents alongside the purchaser in a manner similar to co-signors in the prior art, but instead guarantees the loans that are underwritten using a "cosignloan" product implemented in agreement with a captive lender. This key step replaces the individual co-signor in the prior art with a corporate co-signor that provide a high level of loan security, thereby reducing and/or removing the security risk associated with the purchaser. As a result, the purchase can be approved at the captive lender's best tier or interest rate at potentially higher loan amounts, thereby increasing sales and profits for the dealer.

In several embodiments, the customer is no longer judged for risk based on FICO past performance, or other traditional measures. Instead, the loan is based on a payment-to-income (PTI) basis, supported by the security provided by the corporate co-signor. The dealer will then be able to use the "cosignloan" product parameters to provide appropriate new, used, or certified pre-owned vehicles to the customer/purchaser.

The corporate co-signor receives an administration fee for each loan. The administration fee, in one embodiment, is sent to a reserve account by the captive lender from the dealer booking proceeds. The reserve account is controlled by the corporate co-signor and the captive lender, and has specific debit and credit guidelines to ensure that sufficient funds are available to pay defaulted loans for a particular year until all loans booked in that year are satisfied.

DETAILED DESCRIPTION OF EXEMPLARY EMBODIMENTS

Figure 1:
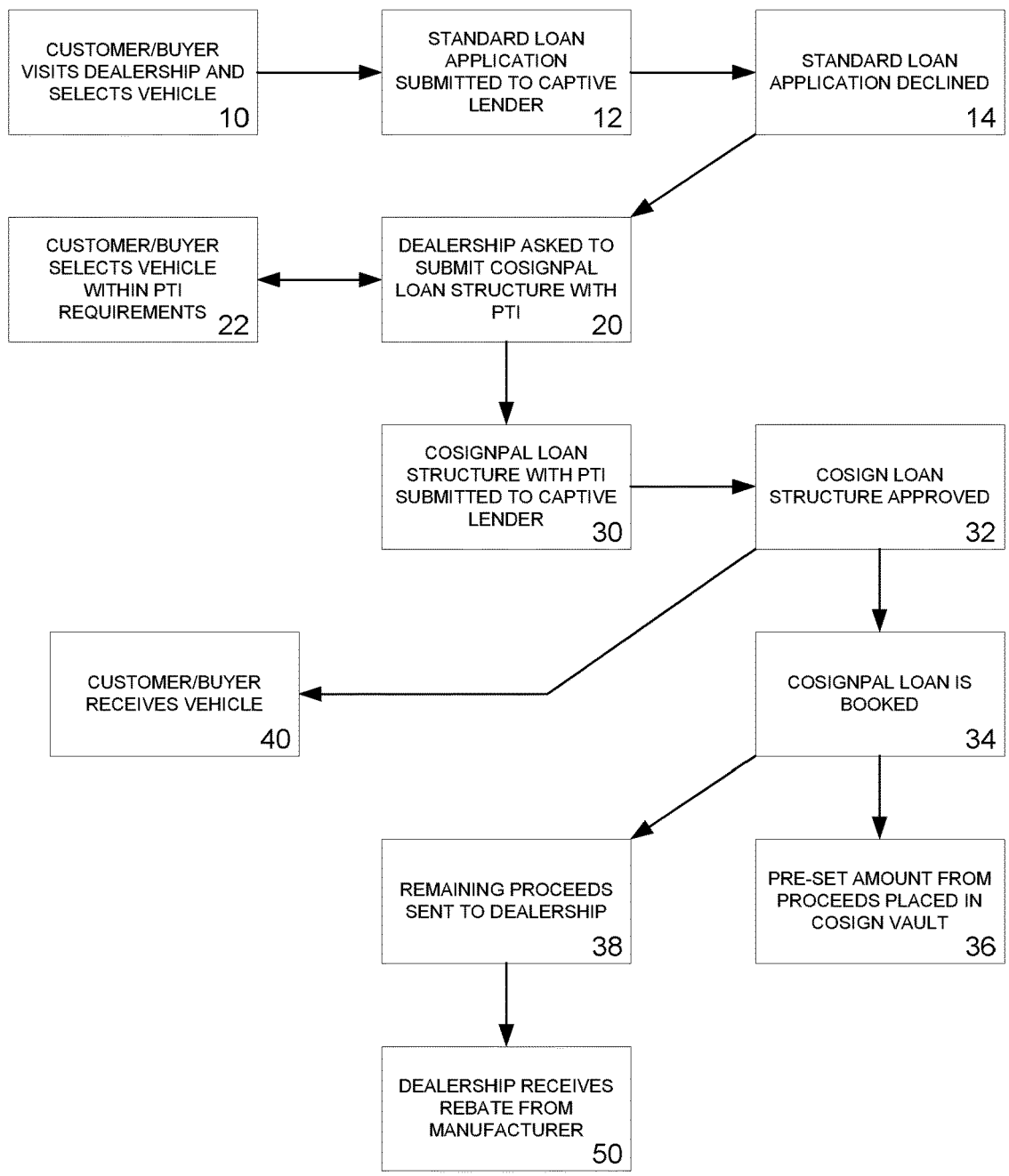
FIG. 1 shows a diagram of a system and method in accordance with an exemplary embodiment of the present invention.
Figure 2:
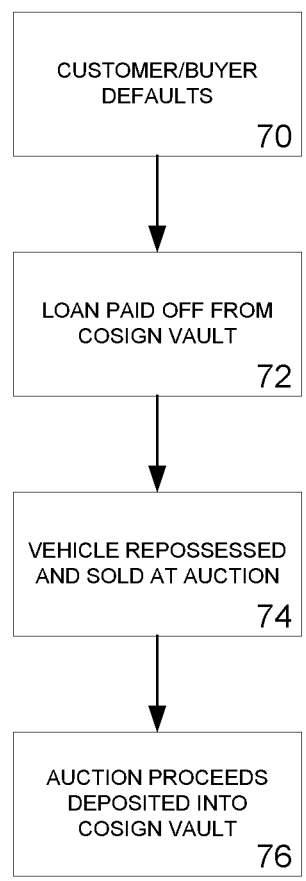
FIG. 2 shows a diagram of another system and method in accordance with an exemplary embodiment of the present invention.

In various exemplary embodiments, the present invention comprises a system and method for providing a corporate "co-signor" for potential purchasers of an automobile who do not meet captive lender or standard bank approval guidelines and are in need of a co-signor. The corporate co-signor does not sign or execute loan documents alongside the purchaser in a manner similar to co-signors in the prior art, but instead guarantees the loans that are underwritten using a "cosignloan" product implemented in agreement with a captive lender. This key step replaces the individual co-signor in the prior art with a corporate co-signor that provide a high level of loan security, thereby reducing and/or removing the security risk associated with the purchaser. As a result, the purchase can be approved at the captive lender's best tier or interest rate at potentially higher loan amounts, thereby increasing sales and profits for the dealer.

Historically, many potential customers are unable to purchase a vehicle at an automotive dealerships because of no credit, little credit, and/or sub-standard credit. Automotive manufacturers and automotive dealers invest an enormous amount of money into advertising to attract potential customers. However, a large portion of their investment is wasted due to the inadequate approval system currently being utilized by the banking and lending industry.

Most automotive manufacturers have a captive lender whose sole purpose is to implement financial products in an attempt to maximize the automotive manufacturer's ability to sell their product. While captive lenders do facilitate a number of vehicle sales, their risk model is conservative at best. This in part is due to their business model and their obligation to their shareholders to not underwrite risky loans. Therefore, in most cases, after visiting a dealership and selecting a desired vehicle 10, many customers are denied credit by the captive lenders 14 after submitting a typical loan application 12, and are subsequently funneled through sub-prime banks in an attempt to secure an approval on a vehicle loan. At this point the automotive dealer's chances of selling a vehicle decrease dramatically.

Sub-prime loan approvals are extremely challenging for an automobile dealer because they almost always require a monetary down payment, have high interest rates, have low payment-to-income (PTI) parameters, have low loan-to-value (LTV) parameters, and have substantial bank fees. The sub-prime banks need for additional money down (or so called "skin in the game") is predicated on the notion that if a customer puts his or her hard earned money into the transaction, he or she is less likely to default. Unfortunately, in many cases, the requested money down is not available, resulting in no loan for the potential customer, and no sale of a vehicle by the dealership.

Further, as a result of high interest rates, a customer is normally forced to purchase an inexpensive vehicle in order to maintain an acceptable payment-to-income ratio (PTI). The customer thus usually purchases an older vehicle with high miles and little to no warranty. As warranties expire and mechanical breakdowns ensue, these customers are faced with unexpected expenses, and thus often get into financial trouble.

This system has evolved over decades and exists because the bank expects a high default ratio and thus wants to make its money quickly through high interest rates, and also minimize its exposure by financing a low amount. Also, these sub-prime banks normally have a very low loan-to-value ratio (LTV) and high bank fees, thus making it virtually impossible for an automotive dealer to obtain an acceptable profit on the transaction. In addition, with the complexity of sub-prime banks' financial products, dealers often are unable to find a vehicle that fits a bank's guidelines and the customer's needs.

In these circumstances, a dealer almost always asks for a suitable co-signer in an attempt to secure more suitable financing for the customer, and enhance profitability for the dealer. Unfortunately, in most cases, this is not easy. Normally, a dealer will go through several family members and/or acquaintances before an acceptable co-signer is found. The problem with this scenario is it often hurts both the bank and the co-signer. The co-signer when approached feels that they are helping a family member or a friend get a vehicle. However, they seldom contemplate the financial obligation they are undertaking. Only when the vehicle loan goes into default does the typical co-signer realize the gravity of their obligation. In many cases, co-signers are unwilling or unable to live up to their obligation. The bank suffers and the person trying to help a friend or family member also suffers. The co-signer process is highly variable, and has no structured process in place to ensure success.

In various exemplary embodiments, the present invention comprises a paradigm shift in the above co-signor process. While the traditional co-signor is an individual who has no process in place to handle the significant financial burden of paying for another person's vehicle loan when a default occurs, the present invention effectively provides a corporate "co-signor" for potential purchasers of an automobile who do not meet captive lender or standard bank approval guidelines and are in need of a co-signor. The corporate co-signor does not sign a loan document alongside the purchaser in the manner described above, but guarantees the loans that are underwritten using a "cosignloan" product outlined in an agreement with a captive lender. This key step replaces the individual co-signor practice described above with a corporate co-signor that provide a high level of loan security, thereby reducing and/or removing the security risk associated with the purchaser. As a result, the purchase can be approved at the captive lender's best tier or interest rate at potentially higher loan amounts, thereby increasing sales and profits for the dealer.

In several embodiments, the customer is no longer judged for risk based on FICO past performance, or other traditional measures. Instead, the loan is based on a payment-to-income (PTI) basis, supported by the security provided by the corporate co-signor. The dealer will then be able to use the "cosignloan" product parameters to provide appropriate new, used, or certified pre-owned vehicles to the customer/purchaser.

The corporate co-signor receives an administration fee for each loan. The administration fee, in one embodiment, is sent to a reserve account (e.g., "cosign vault") 36 by the captive lender from the dealer booking proceeds. The reserve account is controlled by the corporate co-signor and the captive lender, and has specific debit and credit guidelines to ensure that sufficient funds are available to pay defaulted loans for a particular year until all loans booked in that year are satisfied.

In one exemplary embodiment, the corporate co-signor provides pre-established guidelines for loans it will guarantee. Auto purchasers will be approved for a loan by the captive lender on a payment-to-income (PTI) basis, and not FICO; proof of income is mandatory. The maximum loan payment can be no more that 18% of PTI, and the auto purchaser's loan from the captive lender must be approved at the captive lender's top tier, with maximum term and advance requirements complying with the captive lender's tier guidelines for the top tier. The automobile dealer will identify one or more appropriate vehicles from their inventory necessary to "back into" the PTI guidelines, 22 selected only from manufacturer's new or manufacturer's certified pre-owned inventory. Upon approval 32, the customer receives the vehicle 40, and the loan is booked 34. The corporate co-signor receives a pre-established amount (e.g., $2000.00) as an administration fee out of the dealer's booking proceeds; the administration fee is sent via electronic means (e.g., ACH) to a reserve account (e.g., "cosign vault") 36 for the corporate co-signor at the captive lender, with remaining proceeds sent to the dealer 38. In several embodiments, a portion of the administration fee (e.g., 95%) remains in the reserve account for use with future defaults, and the remainder (e.g., 5%) is paid to the corporate co-signor for operational expenses.

The reserve account is jointly controlled by the corporate co-signor and the captive lender, and has specific debit and credit guidelines. In one embodiment, multiple reserve account are established for periods of time (e.g., by calendar year or fiscal year). Thus, all dealer administration fees for a first fiscal year (e.g., a fiscal year for the captive lender) of booked automobile loans guaranteed by the corporate co-signor are deposited in a first reserve account. The first reserve account is held and used to pay off 72 any first fiscal year booked automobile loans that default 70 (with appropriate credit for any asset recovery from repossessed vehicles sold at auction 74 by the secured captive lender; i.e., auction proceeds are deposited into the corresponding reserve account 76). When all corresponding loans booked during the first fiscal year are satisfied, any remaining funds in the first reserve account are released to the corporate co-signor. If the reserve account is exhausted, a social impact investment override account steps in with sufficient funds to cover any remaining defaults (i.e., the reserve account is zeroed out). Similarly, all dealer administration fees for a second fiscal year of booked automobile loans guaranteed by the corporate co-signor are deposited in a second reserve account, which is used in a similar manner for the corresponding loans. This arrangement is repeated for subsequent years.

In some embodiments, the automobile manufacturer provides a conditional dealer cash rebate 50 to the dealer upon completion of the Retail Delivery Report (RDR) for the sale of the automobile using the herein-described invention. A dealer cash rebate goes to the dealer and not the automobile purchaser. The dealer cash rebate from the manufacturer to the dealer will give the manufacturer the ability to lessen the burden of the administration fee on the dealer for specific models when necessary. The amount of the dealer cash rebate can vary based on model line and need at the manufacturer's discretion. In an alternative embodiment, the dealer may make payment of a percentage (e.g., 5%) of the dealer cash rebate to the corporate co-signor as part of or in addition to the administration fee.

In order to provide a context for various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for managing accounts, comprising the steps of:

receiving, at a computer server with a microprocessor in electronic communication with a communications network and a database, an electronic request over the communications network from a first automobile dealer computing device for approval of a first automobile loan from a first lender to purchase an automobile by an automobile buyer, wherein the electronic request comprises automobile buyer data, a first automobile loan amount and date, and identification of a pre-established corporate entity that has a plurality of pre-established automobile loan reserve accounts with said first lender, with each pre-established automobile loan reserve account associated with a reserve account time period, and in the name of said pre-established corporate entity, further wherein the reserve account time period are exclusive of each other;

automatically determining, by the microprocessor, based upon the automobile buyer data, the first automobile loan amount and date, and the pre-established corporate entity identification, whether the first automobile loan qualifies to be associated with a first associated reserve account from said plurality of pre-established automobile loan reserve accounts, wherein the first automobile loan is automatically qualified to be associated with the first associated reserve account when:

the automobile buyer is approved for the first automobile loan by the first lender on a payment-to-income basis;

a maximum loan payment for the first automobile loan can be no more than a pre-established percentage of income; and the first automobile loan is approved at the first lender's top tier with maximum loan term and advance requirements approved at said tier;

upon determining, by the microprocessor, that the first automobile loan qualifies to be associated with the first associated reserve account:

automatically, by the microprocessor, approving the first automobile loan;

automatically, by the microprocessor, associating the first automobile loan with the first associated reserve account, wherein the first associated reserve account is automatically selected based on correspondence of the first automobile loan date and reserve account time period for the first associated reserve account;

automatically, by the microprocessor, transmitting over the communications network an electronic message indicating approval of the first automobile loan to the first automobile dealer;

automatically, by the microprocessor, electronically booking the first automobile loan and storing first automobile loan information in the database, where first automobile loan information includes the automobile buyer data, the first automobile loan amount and date, and the identification of the first associated reserve account;

automatically, by the microprocessor, calculating an amount of booking proceeds of the first automobile dealer from the first automobile loan; and automatically, by the microprocessor, electronically transferring a pre-established amount of funds from the booking proceeds to the first associated reserve account;

wherein the first associated reserve account has a plurality of automobile loans automatically associated therewith, said plurality of automobile loans including the first automobile loan;

automatically receiving, by the microprocessor over the network, information about payment status of the first automobile loan;

automatically monitoring, by the microprocessor over the network, information about payment status of all of said plurality of automobile loans associated with the first associated reserve account;

automatically maintaining, by the microprocessor, funds in the first associated reserve account until all of said plurality of automobile loans associated with the first associated reserve account are paid in full;

automatically withdrawing, by the microprocessor, funds from the first associated reserve account if the first automobile loan is in default payment status, and automatically applying the withdrawn funds to pay off a remaining balance of the first automobile loan, further wherein no funds from any of said plurality of pre-established automobile loan reserve accounts other than the first associated reserve account may be used for said pay off of said first automobile loan;

automatically, by the microprocessor, electronically transferring all remaining funds in the first associated reserve account to the pre-established corporate entity upon automatically determining that all of said plurality of automobile loans associated with the first associated reserve account are paid in full; and automatically, by the microprocessor, closing the first associated reserve account;

wherein the pre-established corporate entity:

is not related to or associated with the automobile buyer;

does not obtain any ownership interest in or lien on the automobile purchased by the automobile buyer; and does not make any payment towards or related to the purchase of the automobile by the automobile buyer.

2. The method of claim 1, further wherein the electronic request from the first automobile dealer must identify one or more appropriate automobiles from dealer inventory such that the maximum loan payment can be no more than a pre-established percentage of automobile buyer income.

3. The method of claim 2, further wherein the automobile purchased must be only from new or certified pre-owned inventory.

4. The method of claim 1, wherein the pre-established percentage of income is 18%.

5. The method of claim 1, wherein the pre-established amount of funds from the booking proceeds is $2000.00.

6. The method of claim 1, wherein the period of time is a calendar year.

7. The method of claim 1, wherein the period of time is a fiscal year.

* * * * *